US009721117B2

United States Patent
Pleau et al.

(10) Patent No.: US 9,721,117 B2
(45) Date of Patent: Aug. 1, 2017

(54) SHARED IDENTITY MANAGEMENT (IDM) INTEGRATION IN A MULTI-TENANT COMPUTING ENVIRONMENT

(71) Applicant: Oracle International Corporation, Redwood Shores, CA (US)

(72) Inventors: Jeffrey Pleau, Carleton Place (CA); Naresh Revanuru, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 22 days.

(21) Appl. No.: 14/853,747

(22) Filed: Sep. 14, 2015

(65) Prior Publication Data

US 2016/0087960 A1 Mar. 24, 2016

Related U.S. Application Data

(60) Provisional application No. 62/052,743, filed on Sep. 19, 2014.

(51) Int. Cl.
*H04L 29/06* (2006.01)
*G06F 21/62* (2013.01)

(52) U.S. Cl.
CPC ...... *G06F 21/6236* (2013.01); *H04L 63/0884* (2013.01); *H04L 63/104* (2013.01)

(58) Field of Classification Search
CPC H04L 63/0884; H04L 63/104; G06F 21/6236
USPC .......................................................... 726/7
See application file for complete search history.

(56) References Cited

U.S. PATENT DOCUMENTS

| | | |
|---|---|---|
| 7,434,252 B2 | 10/2008 | Ballinger et al. |
| 7,577,729 B1 | 8/2009 | Umbehocker et al. |
| 8,261,037 B2 | 9/2012 | Scheuren |
| 8,302,201 B1 | 10/2012 | Gupta et al. |
| 8,352,608 B1 | 1/2013 | Keagy et al. |
| 8,402,514 B1 | 3/2013 | Thompson et al. |
| 8,745,718 B1 | 6/2014 | Dufel et al. |

(Continued)

OTHER PUBLICATIONS

U.S. Appl. No. 14/622,648, Non-Final Office Action mailed on Sep. 13, 2016, 17 pages.

(Continued)

*Primary Examiner* — Baotran N To
(74) *Attorney, Agent, or Firm* — Kilpatrick Townsend & Stockton LLP

(57) ABSTRACT

Techniques are disclosed for enabling tenant hierarchy information to be migrated directly between different multi-tenant system (e.g., from a shared IDM system to a Nimbula system, or vice versa). A corresponding new tenant is created in a Nimbula system based on a combination of the tenant information and the service information from the shared IDM system. The Nimbula system extracts the tenant name and the service name from a request and asks the shared IDM system to verify that the user actually is a member of the tenant identified by the extracted tenant name. Upon successful authentication of the user, the Nimbula system requests the IDM system for roles that are associated with both the user and the extracted service name. The Nimbula system enable access to the service upon determining whether the requested operation can be performed relative to the specified service based on the roles.

20 Claims, 10 Drawing Sheets

(56) References Cited

U.S. PATENT DOCUMENTS

| | | |
|---|---|---|
| 9,027,091 B2 | 5/2015 | Mardikar et al. |
| 9,407,615 B2 | 8/2016 | Shah et al. |
| 2003/0005308 A1 | 1/2003 | Rathbun et al. |
| 2005/0138362 A1 | 6/2005 | Kelly et al. |
| 2006/0015933 A1 | 1/2006 | Ballinger et al. |
| 2007/0150934 A1 | 6/2007 | Fiszman et al. |
| 2008/0287136 A1 | 11/2008 | Ludwig et al. |
| 2009/0070092 A1 | 3/2009 | Dickens et al. |
| 2009/0094684 A1 | 4/2009 | Chinnusamy et al. |
| 2009/0276824 A1 | 11/2009 | Rafiq et al. |
| 2009/0313684 A1 | 12/2009 | Shah et al. |
| 2011/0022812 A1 | 1/2011 | van der Linden et al. |
| 2011/0238737 A1 | 9/2011 | Agrawal et al. |
| 2012/0084869 A1 | 4/2012 | Bilaney et al. |
| 2012/0233668 A1 | 9/2012 | Leafe et al. |
| 2012/0246695 A1 | 9/2012 | Cameron et al. |
| 2012/0266156 A1 | 10/2012 | Spivak et al. |
| 2012/0266168 A1 | 10/2012 | Spivak et al. |
| 2013/0007891 A1 | 1/2013 | Mogaki et al. |
| 2013/0232498 A1 | 9/2013 | Mangtani et al. |
| 2013/0283350 A1* | 10/2013 | Afek ................. G06F 21/6218 726/4 |
| 2013/0318242 A1 | 11/2013 | Srinivasa |
| 2014/0047434 A1 | 2/2014 | Lam et al. |
| 2014/0215595 A1 | 7/2014 | Prasad et al. |
| 2014/0280805 A1 | 9/2014 | Sawalha |
| 2014/0298323 A1 | 10/2014 | Stolberg et al. |
| 2014/0337493 A1 | 11/2014 | Tung |
| 2014/0373126 A1 | 12/2014 | Hussain et al. |
| 2015/0180868 A1 | 6/2015 | Sng |
| 2015/0227749 A1 | 8/2015 | Schincariol et al. |
| 2015/0229521 A1 | 8/2015 | Mayer et al. |

OTHER PUBLICATIONS

U.S. Appl. No. 14/622,638, "Non-Final Office Action", mailed Nov. 4, 2016, 17 pages.

U.S. Appl. No. 14/622,638, "Final Office Action", mailed Jun. 5, 2017, 28 pages.

U.S. Appl. No. 14/622,648, "Final Office Action", mailed Apr. 20, 2017, 27 pages.

* cited by examiner

SHARED IDENTITY MANAGEMENT (IDM) INTEGRATION IN A MULTI-TENANT COMPUTING ENVIRONMENT

CROSS-REFERENCE TO RELATED APPLICATIONS

The present application claims the benefit and priority of U.S. Provisional Patent Application No. 62/052,743, filed Sep. 19, 2014, entitled "SHARED IDM INTEGRATION WITH NIMBULA FOR IAAS USE CASES," the entire contents of which are incorporated herein by reference for all purposes.

BACKGROUND

In a cloud computing environment, an infrastructure including server computers and other computing hardware can be shared among multiple different customers or tenants. The infrastructure may be provided as a service, e.g., Infrastructure As A Service (IAAS). Infrastructure can also include operating system and software elements that are essential to the operation of the hardware, and/or that all customers are likely to use. Each such customer or a tenant can lease some share of the infrastructure. In this manner, customers can obtain computational resources for performing their computing tasks without heavily investing in equipment—that is, infrastructure—to perform those tasks.

Infrastructure can be used by the customers as a service, but not owned by the customers. The customers typically purchase a time-based or resource quota-based share of the use of the infrastructure from the owner of the infrastructure. The owner then provides the infrastructure resources to the customers, so that the customers can use as the resources as they desire. The specific identities and locations of resources for an infrastructure on which the customer's tasks execute might not even be apparent to the customers; such details need not concern them. The cloud therefore abstracts the infrastructure to the customers as a service (e.g., IAAS).

More generally, cloud computing involves the use of computing resources (e.g., hardware and software) that are delivered as a service over a network (typically the Internet). Cloud computing entrusts remote services with a user's data, software, and computation. Cloud computing can also be used to offer software as service (Saas) or a platform as a service (PaaS), for example. In a business model using SaaS, users can be provided access to application software and databases. The cloud providers can manage the infrastructure and platforms on which the applications execute. SaaS providers generally price applications using a subscription fee. SaaS can allow a business the potential to reduce information technology operational costs by outsourcing hardware and software maintenance and support to the cloud provider. This outsourcing can enable the business to reallocate information technology operations costs away from hardware/software spending and personnel expenses, towards meeting other information technology goals. Furthermore, with applications hosted centrally, updates can be released without the need for users to install new software. However, because users' data are stored on the cloud provider's server, some organizations can be concerned about potential unauthorized access to that data.

End users can access cloud-based applications through a web browser or a light-weight desktop or mobile application. Meanwhile, the business software and users' data can be stored on servers at a location that is remote from that business and from those users. Cloud computing at least theoretically allows enterprises to deploy their applications more rapidly, with improved manageability and less maintenance. Cloud computing at least theoretically enables information technology managers to adjust resources more quickly to meet sometimes fluctuating and unpredictable business demands.

Because each customer or tenant of a cloud computing environment is likely to be associated with multiple separate users, each having a separate user identity, the infrastructure provided by a cloud computing environment can include an identity management (IDM) element. IDM involves controlling information about users of computer system. Such information can include information that authenticates the identities of such users. Such information can include information that describes which data those users are authorized to access. Such information can include information that describes which actions those users are authorized to perform relative to various system resources (e.g., files, directories, applications, communication ports, memory segments, etc.) IDM can also include the management of descriptive information about each user and about how and by whom that descriptive information can be accessed and modified.

Potentially, a cloud computing environment could include a separate IDM system, or separate instance of an IDM system, for each separate organization that used the cloud computing environment. However, such a scheme could be seen as being duplicative of effort and as being wasteful of computing resources. Therefore, instead of spawning a separate IDM system for each cloud tenant, a single cloud-wide shared IDM system can be implemented to serve all of the cloud's tenants. The IDM can be partitioned into multiple separate identity domains-one or more per tenant.

Within the cloud computing environment, a set of constructs can be created which, when all aligned together, expose an abstraction of, or "tenant-sliced" view of, a single IDM system. This single IDM system can include multiple separate components or sub-systems. The IDM system can be shared among multiple independent and separate tenants, or IDM system customers, so that the IDM system is more densely utilized. Thus, there is no need for a separate IDM system to be instantiated for each separate customer. The single IDM system can be configured such that, for each tenant of the IDM system, a virtual view of the IDM system that is specific to that tenant can be presented to that tenant's users.

Separate views of the IDM system can be virtualized within the single IDM system in a manner that is conceptually similar to the manner in which multiple separate virtual machines can be virtualized on a single host computing device. This virtualization can be achieved by configuring the IDM system in a specific manner. The IDM system can involve multiple separate layers, including upper layers and lower layers that are conceptually vertically stacked one on top of the other. The upper layers, at least, can be partitioned. In the IDM system, various different services (e.g., authentication and/or authorization services) can be associated with various different tenants of the IDM system. The IDM system can isolate each tenant so that each tenant is capable of interacting only with the IDM system "slice," or partition, that is dedicated to that tenant. Thus, the IDM system can enforce isolation between tenants.

For each separate tenant, the shared IDM system can store the identities of the users that are associated with that tenant. Additionally, for each separate tenant, the shared IDM system can store definitions of rules that are associated with that tenant. Within the data structures maintained by the shared IDM system, each tenant can be represented as a top-level container. Because the shared IDM system enforces isolation between these containers, a user associated with a first tenant is prevented from accessing information about a user associated with a second, different tenant.

Various different infrastructure components can be provided within a cloud computing environment. One such component is a system that provides a multi-tenant virtualized environment (e.g., a Nimbula System). Within the environment, each separate tenant can be associated with a separate isolated hierarchy of resources that are accessible only to that tenant. Each tenant's hierarchy can include resources such as virtual machines, storage volumes (e.g., virtual hard drives) that can be accessed by those virtual machines, and other entities that represent and manage the tenant's objects. A Nimbula system can prevent users and applications in one tenant's hierarchy from accessing any other tenant's hierarchy.

Although a shared IDM system and a Nimbula system both provide cloud computing resources to customers in a shared manner, these systems sometimes do not represent things in the same manner. For example, a shared IDM system might be compared to an orchard, in which each tenant or customer of the system is represented as a completely separate tree. In contrast, a Nimbula system might be compared to a single tree trunk having many branches diverging from it, in which each branch emerging directly from the trunk corresponds to a separate tenant or customer of the system. Even if a shared IDM system involves some over-arching structure that contains all of the many different customers' hierarchies, the shared IDM system does not represent the hierarchies as being any part of such an over-arching structure in any way. The customers of the shared IDM system do not view their hierarchies as being part of such an over-arching structure. In contrast, a common root from which all customers' hierarchies descend exists in a Nimbula system, and this common root is visible to the customers of the Nimbula system, even if the common root is not accessible to those customers.

The different ways in which these systems represent tenants' hierarchies can make the integration or interfacing of these systems difficult. The differences in representation also can make migration directly from one kind of system to the other a complicated matter.

BRIEF SUMMARY

Techniques are disclosed for enabling tenant hierarchy information to be shared across multiple different multi-tenant environments. Integration of systems that represent tenant hierarchical information may be difficult. Specifically, some embodiments of the invention enable migration of hierarchical tenant information directly from one kind of system to the other (e.g., from a shared IDM system to a Nimbula system, or vice versa).

In at least one embodiment, for a service subscribed to by a tenant in a shared IDM system, a corresponding new tenant can be created in a Nimbula system. That new tenant has a name that is a combination of the tenant named from the shared IDM system and the service name from the shared IDM system. When a user of the Nimbula system desires to perform an operation relative to a service specified by such a combination, the Nimbula system extracts the tenant name and the service name from the combined name. The Nimbula system asks the shared IDM system to verify that the user actually is a member of the shared IDM tenant that is identified by the extracted tenant name. If this authentication is successful, then the Nimbula system searches the shared IDM system's LDAP directory for roles that are associated with both the user and the extracted service name. For each such role, the Nimbula system associates a corresponding group identifier with the user in the Nimbula system. The Nimbula system then consults its own permission tables to determine whether any of the group identifiers associated with the user permit the user to perform the requested operation relative to the specified service. The Nimbula system either permits or denies the operation as per the outcome of this consultation.

In some embodiments, enabling sharing of tenant hierarchy information across different multi-tenant environments may be implemented by a computing system. The computing system may implement a multi-tenant virtual environment. The computing system may be configured to implement methods and operations described herein. Yet other embodiments relate to systems and machine-readable tangible storage media, which employ or store instructions for methods and operations described herein.

In at least one embodiment, a method may include receiving, at a first computing system of a computing infrastructure system that provides access to a plurality of services, a request by a user to access a service of the plurality of services. The computing infrastructure system may restrict each tenant of the computing infrastructure system to one of the plurality of services. The method may include extracting, by the first computing system, a tenant name and a service name of the service from a combined name included in the request. The method may include authenticating, by the first computing system, the user by requesting a second computing system to determine whether the user is a member of a tenant having the tenant name in the second computing system. The second computing system may be different from the first computing system. For example, the second computing system may be included in an identity management system. The method may include, upon successfully authenticating that the user is a member of the tenant, accessing a directory of the second computing system to identify a set of roles that is both associated with the user and with a first service having the service name in the second computing system. The first service may be one of the plurality of services. The method may include, based on the set of roles, determining whether the user is permitted to perform an operation specified in the request relative to the service specified in the request. The method may include enabling the user to access the first service to perform the operation upon determining that a role in the set of roles is permitted to perform the operation specified in the request. The method may include preventing the user from accessing the first service to perform the operation upon determining that no role in the set of roles is permitted to perform the operation specified in the request.

In some embodiments, authenticating the user may include sending a request to the second computing system to determine whether the user is a member of the tenant. The second computing system may provide the user with access to the first service based on a subscription by the tenant to the first service managed by the identity management system. The identity management system may store roles information about each of the set of roles for accessing the first service. In some embodiments, accessing the direct of the second computing system to identify the set of roles includes receiving the role information about each of the set of roles that is both associated with the user and with the first service having the service name.

In some embodiments, the method may include generating, by the first computing system, tenant information based on the tenant for which the user is a member and storing, at the first computing system, service data about the first service having the service name in association with the tenant information. The tenant information may include the tenant name. The service data may indicate role information about the set of roles for accessing the first service.

In some embodiments, the method may include: requesting the second computing system to provide subscription information for one or more services to which the tenant is subscribed, wherein the first service is included in the one or more services; generating, by the first computing system, a service node structure including tenant information for the tenant permitted to access the first service, wherein the tenant information is based on a combination of the tenant name and the service name; storing the node structure in association with a root node structure, the root node structure storing information identifying a plurality of service node structures; generating a role node structure including service data about the first service having the service name in association with the tenant information, wherein the service data indicates role information about the set of roles for accessing the first service; storing the service node in association with the node structure; and preventing the user from accessing the first service to perform the operation upon determining that no role in the set of roles is permitted to perform the operation specified in the request. The second computing system may be included in an identity management system, wherein the directory is a Lightweight Directory Access Protocol (LDAP) directory that includes a node structure for each of a plurality of identity domains, the node structure for each of the plurality of identity domains identifying one or more roles defined within the identity domain. The identity management system may store role information about each of the set of roles for accessing the first service. Authenticating the user may include: sending a request to the second computing system to determine whether the user is a member of the tenant having the tenant name, and receiving, from the second computing system, an authentication response indicating that the user is the member of the tenant having the tenant name. The second computing system may provide the user with access to the first service based on a subscription by the tenant to the first service of the one or more services. Accessing the directory of the second computing system to identify the set of roles may include receiving the role information about each of the set of roles that is both associated with the user and with the first service having the service name.

The foregoing, together with other features and embodiments will become more apparent upon referring to the following specification, claims, and accompanying drawings.

DETAILED DESCRIPTION

Figure 1:
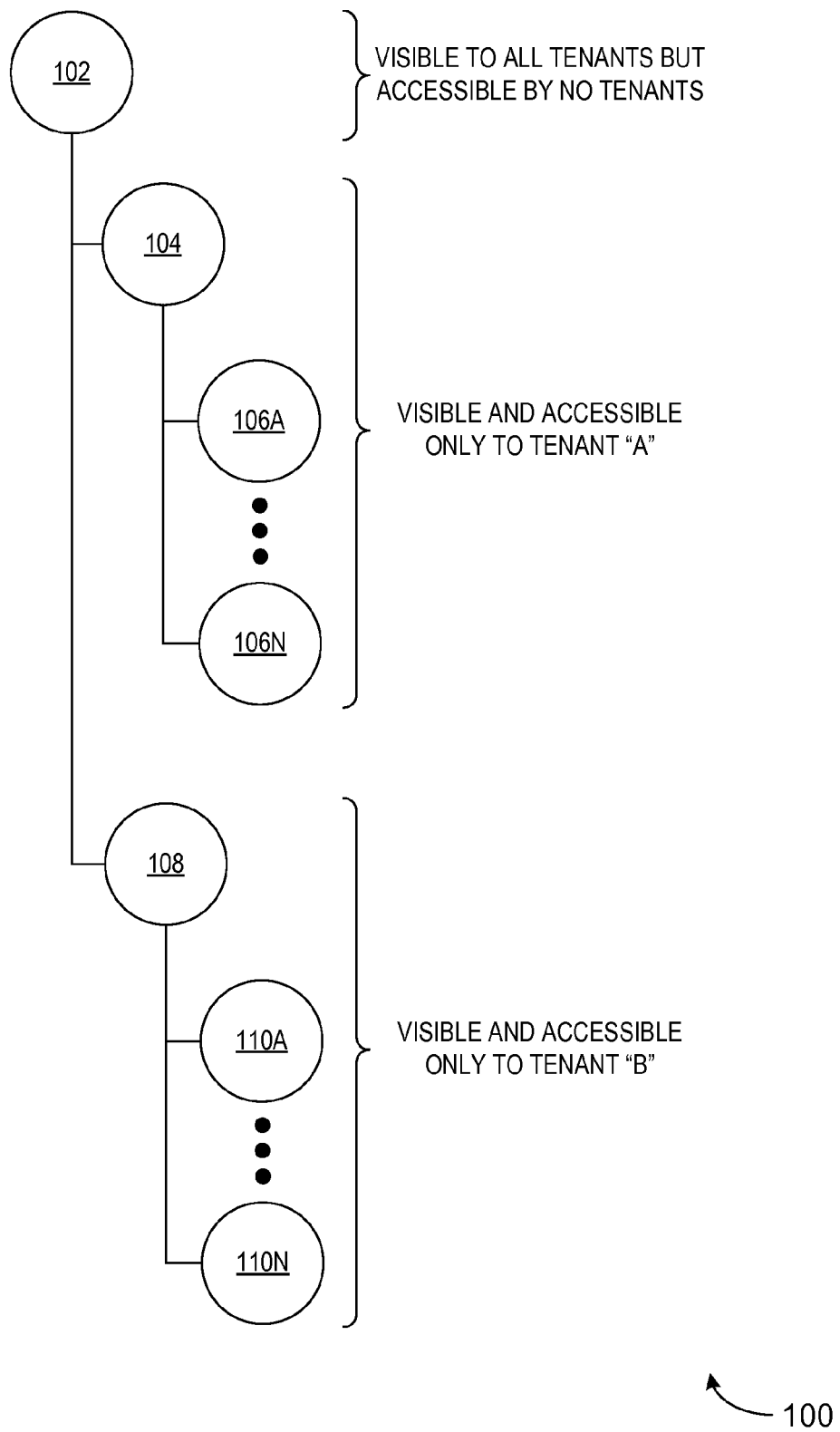
FIG. 1 is a diagram that illustrates an example of a system that implements a multi-tenant virtual environment for providing a computing infrastrasture to one or more customers, according to an embodiment of the invention.

In a cloud computing environment, a multi-tenant virtualized system (e.g., a Nimbula System) can be provided to allow computing resources to be shared among multiple tenants. A Nimbula system can be compared to a single storage drive containing multiple directories. Although various different subsets of the directories may be accessible to different users of the drive, some directories that are accessible to some users might not be accessible to some other users.

In a Nimbula system, each tenant has a separate hierarchy that is comparable to a directory. That tenant can access his own hierarchy and no other tenant's hierarchy. Computing resources may be shared in a manner that isolates each tenant's resources from each other tenant's resources, organizes environmental resources in a manner that is similar to a conventional file system. For example, each separate tenant can be associated with a separate isolated hierarchy of resources that are accessible only to that tenant. Each tenant's hierarchy can include resources such as virtual machines, storage volumes (e.g., virtual hard drives) that can be accessed by those virtual machines, and other entities that represent and manage the tenant's objects.

A Nimbula system can prevent users and applications in one tenant's hierarchy from accessing any other tenant's hierarchy. For example, a Nimbula system can prevent a tenant from being able to view any hierarchy than that tenant's own hierarchy. Nevertheless, the invisibility of other tenant's hierarchies in the Nimbula system does not necessarily prevent any particular tenant from being aware of the existence of other tenant's hierarchies within the system. In a Nimbula system, information about tenants may be stored in a hierarchical manner using one or more data structures (e.g., nodes). In a Nimbula system, customer's hierarchies depend from a common root node. Users of a Nimbula system can see this common root node, but are prevented from viewing any descendant of that root node other than the hierarchy that belongs to the customer with which those users are associated. When the users of the Nimbula system refer to some object within the hierarchy, the root node is included within the reference to that object. The root node is found at the beginning of the expression of the path to that object in the system.

As explained above, a shared identity management (IDM) system and a Nimbula system both provide cloud computing resources to customers in a shared manner. However, these systems sometimes do not represent things in the same manner. For example, a shared IDM system might be compared to an orchard, in which each tenant or customer of the system is represented as a completely separate tree. In contrast, a Nimbula system might be compared to a single tree trunk having many branches diverging from it, in which each branch emerging directly from the trunk corresponds to a separate tenant or customer of the system. As a result, integration of systems that represent tenant hierarchical information may be difficult. These differences further lead to challenges in migration of hierarchical tenant information directly from one kind of system to the other (e.g., from a shared IDM system to a Nimbula system, or vice versa). Accordingly, techniques are described herein for enabling tenant hierarchy information in different multi-tenant environments.

FIG. 1 is a diagram that illustrates an example of a system 100 that implements a multi-tenant virtual environment (e.g., a Nimbula system) for providing a computing infrastrasture to one or more customers. System 100 may be implemented as a cloud computing infrastructure system. System 100 may perform cloud computing operations and management for a public cloud infrastructure or for a private cloud infrastructure behind a company's firewall. System 100 may perform administration and management of data processes and data structures in an electronic data processing system whether in a virtual machine or otherwise, allocating computing resources, and distributing workload among operational computers, processors and other system resources. As described further below, system 100 may maintain one or more data structures storing information about computing resources and/or services provided to users. Computing resources may include, without limitation, a processing unit (e.g., a processor, multiple processors, or a multicore processor), a memory, a virtual machine, a hypervisor, or other types of computing resources. System 100 may provide services in a virtual computing environment. The services offered by resource management system 140 may include, without limitation, Software as a Service (Saas) services, Platform as a service (PaaS) services, and IaaS services.

User of system 100 and the services provided by system 100 may be accessed using a client computing system ("client system"). The client computing system may be communicatively coupled to system 100. The services may be accessible via a communication network such as the Internet. Users operating a client system may use one or more applications to interact with system 100 to access the services provided by system 100.

System 100 may be implemented using a computer system. The computer system may include one or more computers and/or servers, which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computer system may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. System 100 may be implemented using hardware, firmware, software, or combinations thereof. In various embodiments, system 100 may be configured to run one or more services or software applications described in the foregoing disclosure. For example, system 100 may correspond to a computing system for performing processing as described herein according to an embodiment of the present disclosure. In some embodiments, system 100 may be implemented using a cloud infrastructure system comprising one or more computers and/or servers that may include those described above.

System 100 may include several subsystems and/or modules, including some, which may not be shown. System 100 may have more or fewer subsystems and/or modules than shown in the figure, may combine two or more subsystems and/or modules, or may have a different configuration or arrangement of subsystems and/or modules. The subsystems and/or modules may be configured to perform operations described herein. Subsystems and modules of system 100 may be implemented in software (e.g., program code, instructions executable by a processor), in hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

System 100 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in system 100 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

System 100 may include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. In some embodiments, system 100 may be coupled to or may include one or more data stores, such as a data store for storing data structures such as nodes described herein.

In at least one embodiment, system 100 can store information in a data structure organized as a hierarchical data structure, such as tree data structure. The data structure can be implemented using one or more types of data structures including, without restriction, a linked list, an array, a hashtable, a map, a record, a graph, or other type of data structure. In some embodiments, system 100 can organize data differently from a manner in which data structures are illustrated and/or described herein. A hierarchical data structure can include a plurality of data structures, each data structure referred to herein as "a node." Although shown with a particular number of nodes and a particular number of levels, a hierarchical data structure can include more or fewer nodes and/or more or fewer levels than shown in FIG. 4. Examples of nodes are described below including references to FIGS. 3 and 4.

In at least one embodiment, system 100 may store a plurality of nodes arranged in a hierarchical manner. The plurality of nodes may collectively store tenant information about services accessible to those tenants and other information related to accessing those services. For example, system 100 may include a root node from which two different tenant's hierarchies descend, according to an embodiment of the invention. Information about each of the tenant's hierarchies may be shown following one or more nodes that descend from root node. For example, in FIG. 1, root node 102 is at the root of system 100. A hierarchy belonging to a tenant "A" descends from root node 102 and includes node 104. Nodes 106A-N descend from node 104. Another hierarchy, belonging to a different tenant "B," also descends from root node 102 and includes node 108. Nodes 110A-N descend from node 108.

Nodes 106A-N and nodes 110A-N can represent various resources of an infrastructure (e.g., computing resources), such as virtual machines and/or storage volumes. Additionally or alternatively, nodes 106A-N and nodes 110A-N can represent various system identities, such as individual users and/or groups of multiple users, for example. Nodes 106A-N and nodes 110A-N also could represent roles that can be assign to users, for example.

In system 100, root node 102 is visible to all tenants of system 100 and their users, but is not accessible by any of those tenants or their users. A reference to root node 102 is included in path-based references to each of nodes 106A-N, but contents of root node 102 cannot be read, modified, or deleted by any of the users of tenants "A" or "B." Thus, a fully-qualified reference to node 106A would be, in this example, node 102/node 104/node 106A. Similarly, a fully-qualified reference to node 110A would be, in this example, node 102/node 108/node 110A.

Nodes 104 and 106A-N are visible to and accessible by tenant "A" and its users, but are not visible or accessible by any other tenants or their users. Thus, tenant "B" and its users cannot see or access any of nodes 104 or 106A-N. Conversely, nodes 108 and 110A-N are visible to and accessible by tenant "B" and its users, but are not visible or accessible by any other tenants or their users. Thus, tenant "A" and its users cannot see or access any of nodes 108 or 110A-N. System 100 enforces isolation between tenants "A" and "B" and their respective hierarchies, but both tenants "A" and "B" are aware of the parent-child relationship between root node 102 and their own hierarchies.

Some shared IDM systems, excluding the Nimbula system, can be implemented as Lightweight Directory Access Protocol (LDAP) directories. In such systems, a single LDAP directory can store information pertaining to multiple separate identity domains within a virtualized multi-tenant (e.g., cloud-based multi-tenant) IDM system.

Figure 2:
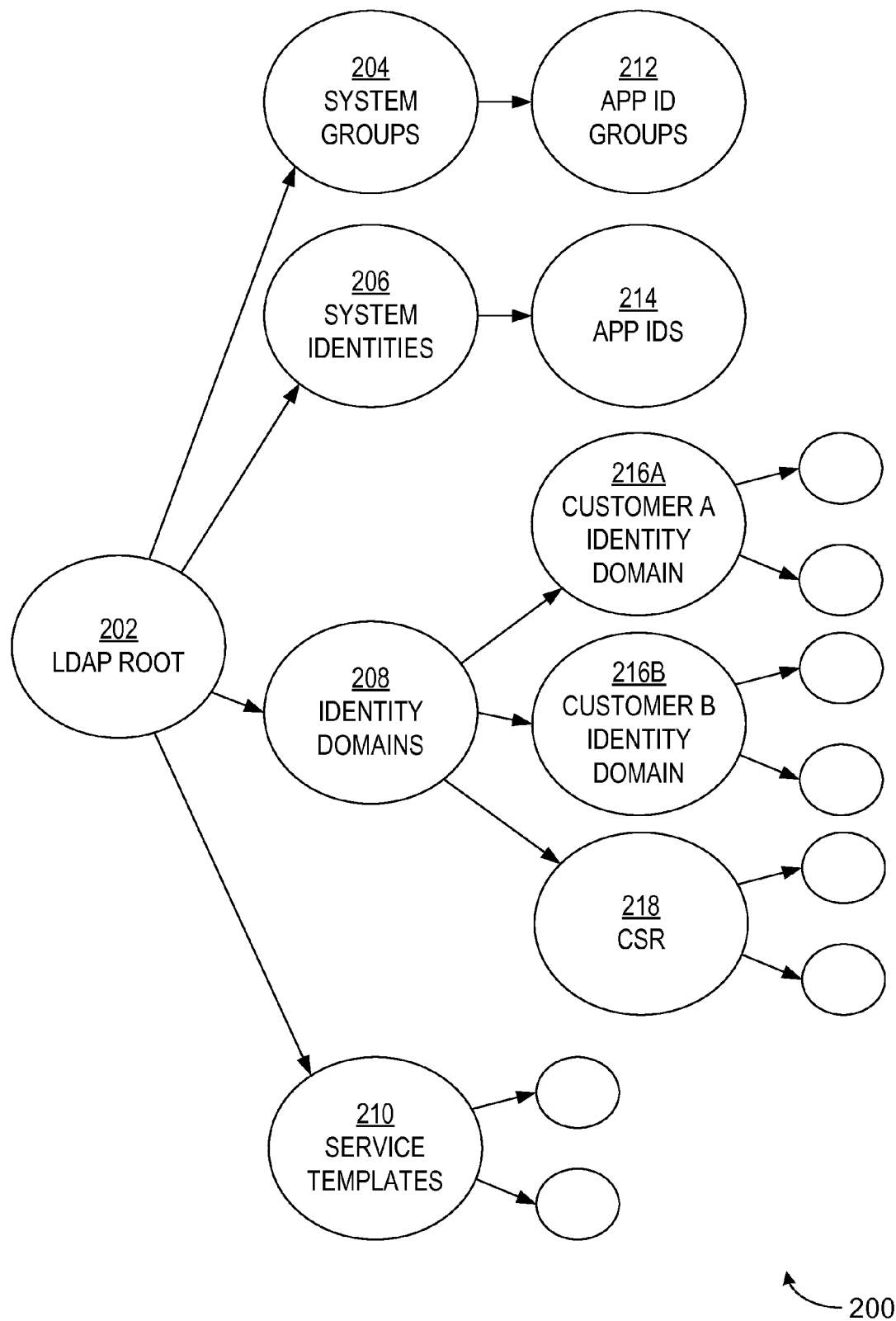
FIG. 2 is a hierarchical diagram that illustrates an example of a structure of multi-tenant LDAP directory for a cloud-based IDM system, according to an embodiment of the invention.

FIG. 2 is a hierarchical diagram that illustrates an example of a data structure of a multi-tenant LDAP directory, e.g., multi-tenant LDAP directory 200, for a shared IDM (e.g., cloud-based IDM) system according to an embodiment of the invention. A cloud-based IDM system may store data in one or more data structures, e.g., nodes. For example, LDAP root 202 may represent a parent to multiple nodes such as system groups node 204, system identities node 206, identity domains node 208, and service templates node 210.

System groups 204 can be a parent to nodes that represent groups of identities that are cloud system-wide rather than identity domain-specific. System groups 204 can be parent to application ("app") identity (ID) groups, each of which can group together various application identities as an identified group. System identities 206 can be a parent to nodes that represent individual identities that are cloud system-wide rather than identity domain-specific. System identities can be parents to app IDs, which can identify individual applications whose identities are cloud system-wide rather than identity domain-specific.

Identity domains 208 can be parent to nodes for various separate identity domains, such as customer A identity domain 216A, customer B identity domain 216B, and CSR (or operations) identity domain 218. As is discussed above, each of these identity domain nodes can be parent to numerous other nodes pertaining to roles and identities within their respective identity domains. Furthermore, although FIG. 2 shows a single identity domain per customer (e.g., A and B), in alternative embodiments, each customer can have multiple separate identity domains.

Service templates 210 can be parent to numerous nodes that are roots of role hierarchies for different service types. As is discussed above, different service types can be mapped to pre-defined role hierarchies that can be automatically added to an identity domain when a service of that type is added to that identity domain, sparing a user from manually creating such roles for that service.

It can be desirable under some circumstances to integrate a multi-tenant virtual system (e.g., a Nimbula system), such as the example shown in FIG. 1, with a shared IDM system, such as the example shown in FIG. 2. However, the task of integrating these two disparate systems is complicated by the fact that there is not necessarily a one-to-one correspondence between a tenant represented in the Nimbula system and a tenant represented in the shared IDM system. Significantly, in the shared IDM system, a single tenant can possess multiple subscriptions to multiple different cloud-based services. This can be contrasted to the model used within a Nimbula system, in which a single tenant subscribes to no more than one service.

A first example can be described in which the information stored for a tenant may be defined different based on the tenant hierarchy implemented for the system, e.g., a shared IDM system or a Nimbula system. In a shared IDM system, the fact of whether a particular user can access a particular service can be expressed as a stored statement having the syntax [service_name].[role_name], where a user has access to the service indicated by [service_name] if that user has been assigned the role indicated by [role_name]. In contrast to a shared IDM system, in a Nimbula system, groups can be defined subordinate to a particular service. These groups can be associated with different roles. Each role can define a different set of permissions that describes how the particular service can be used by members of a group with which that role is associated.

Figure 3A:
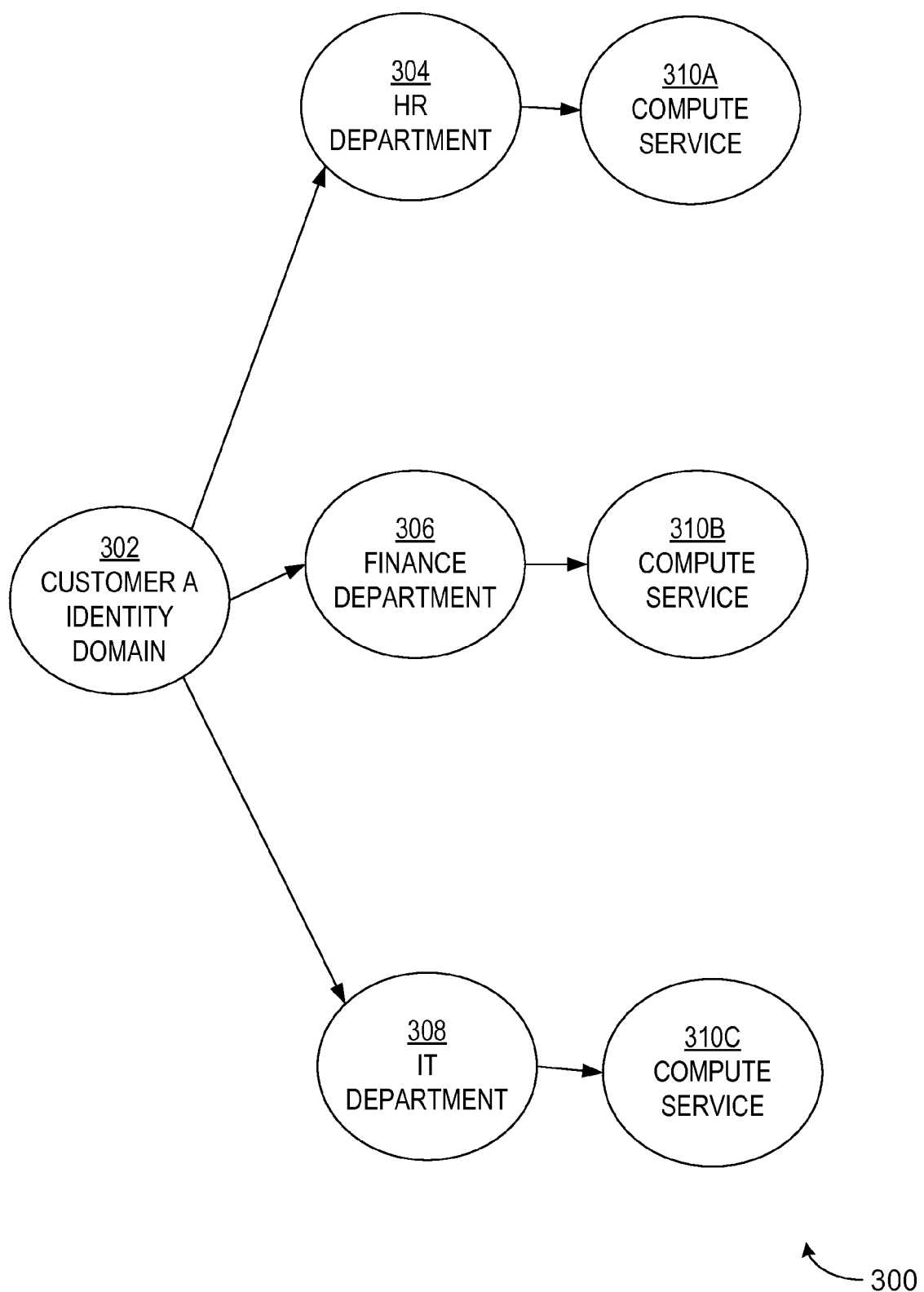
FIGS. 3A and 3B are examples of a shared IDM system tenant that has subscriptions to different types of services according to an embodiment of the invention.
Figure 3B:
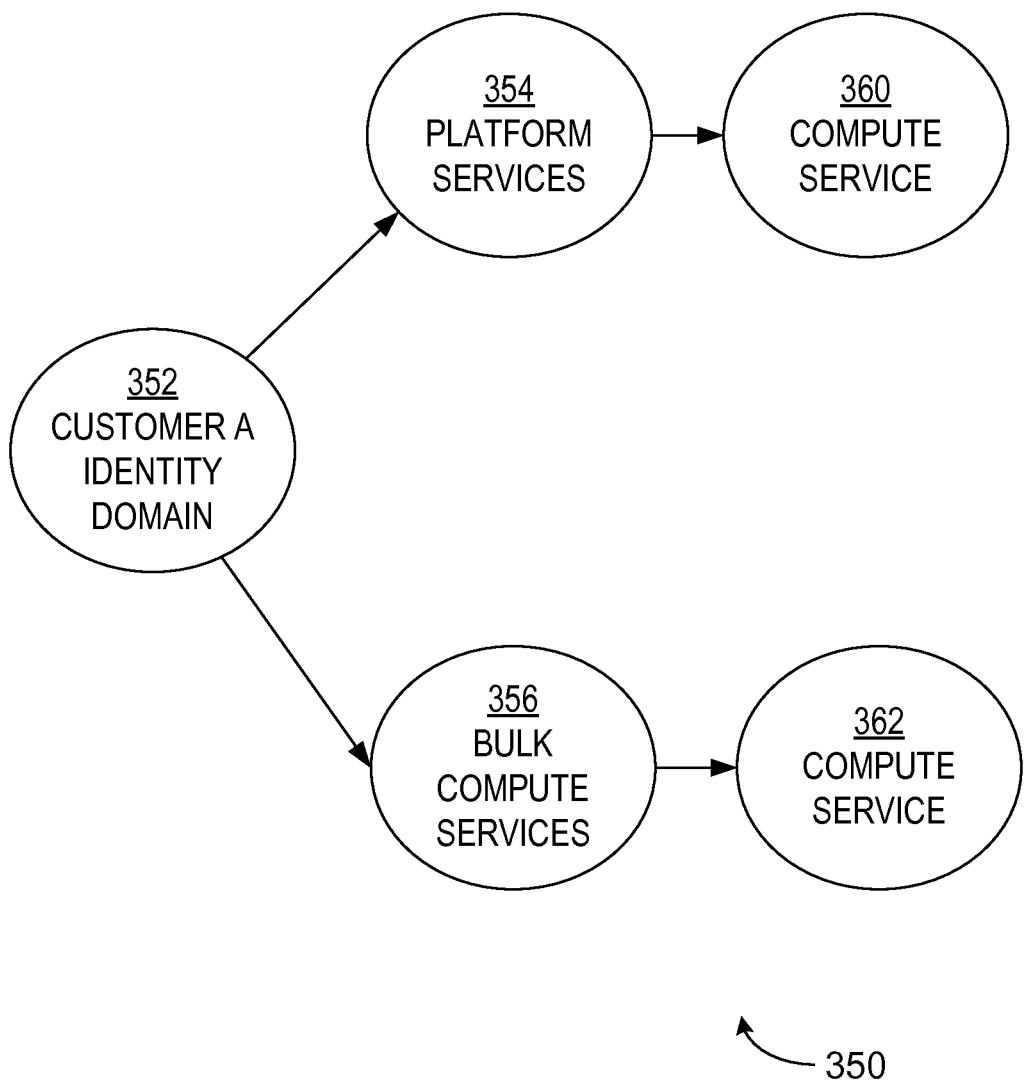

FIGS. 3A and 3B shows examples of a tenant of shared IDM system 300 having subscriptions to different services according to embodiments of the invention. FIG. 3A shows one example of a shared IDM system 300 tenant that has subscriptions to three different services of the same type, according to an embodiment of the invention. This example is shown to compare with a multi-tenant virtual system, such as a Nimbula system which may store tenant hierarchy information different. In a Nimbula system, tenant hierarchy may be stored according to a model that defines only one service subscription per tenant.

In IDM system 300, a customer "A" identity domain 302 is the parent of an HR department 304, a finance department 306, and an IT department 308. Each of departments 304-308 has a subscription to a separate service of the same type. In this example, the type of the service to which each of departments 304-308 subscribes is a compute service. Each compute service can be a separately provisioned virtual machine in the cloud computing environment, for example. HR department 304 subscribes to compute service 310A. Finance department 306 subscribes to compute service 310B. IT department 308 subscribes to compute service 310C. Thus, customer "A" identity domain 302 has subscriptions to three services of the same type. This multiple-subscription-per-tenant example is typically not possible in the Nimbula system model.

FIG. 3B shows another example of a shared IDM system 350 tenant that has subscriptions to different types of services according to an embodiment of the invention. In this example, the different types of services correspond to an organization of types of services provided by an IDM system different from the organization shown in FIG. 3A. For example, an IDM system may provide access to services including platform services ("path-managed services") and bulk compute services. Although FIGS. 3A and 3B show particular types of services, a shared IDM system can organize services based on many different types suitable to a provider of services. This example is shown to compare with a multi-tenant virtual system, such as a Nimbula system which may store tenant hierarchy information different. In a Nimbula system, tenant hierarchy may be stored according to a model that defines only one service subscription per tenant.

Continuing with the example of IDM system 350, platform services may provide services at a platform-level of a computing infrastructure. Platform services may be path managed services in which an object representing a service is created for each type of platform-level service. Bulk compute services may be customer defined and/or generic compute services that enable a customer to perform many types of operations. Services may be organized in this manner to isolate resources for platform-managed services from those for customer generated, bulk compute services. Similar to IDM system 300, each of the different types of services may have one or more roles enabling accessing to those services.

In IDM system 350, a customer "A" identity domain 352 is the parent of Platform Services type 354 and Bulk Compute Services type 354. Each of the different service types 354, 356 has a subscription to a separate service of the same type. In this example, the type of the service to which each of different service types 354, 356 subscribes is a compute service. Each compute service can be a separately provisioned virtual machine in the cloud computing environment, for example. Platform Services 354 provides subscriptions to compute service 360. Bulk Compute Services 356 provides subscriptions to compute service 362. Thus, customer "A" identity domain 352 has subscriptions to services of different types. This multiple-subscription-per-tenant example is typically not possible in the Nimbula system model.

According to an embodiment of the invention, techniques disclosed herein can automatically read a hierarchical structure in a shared IDM system and can automatically generate a functionally equivalent hierarchical structure in a Nimbula system. Given a service subscription by a particular tenant in the shared IDM system, techniques disclosed herein automatically provision, or create, in a Nimbula system, a service that is identified by both the particular tenant and the name of the service subscription. Within the Nimbula system, a tenant is created. The tenant functionally encompasses both the shared IDM system tenant and the service subscription.

Figure 4:
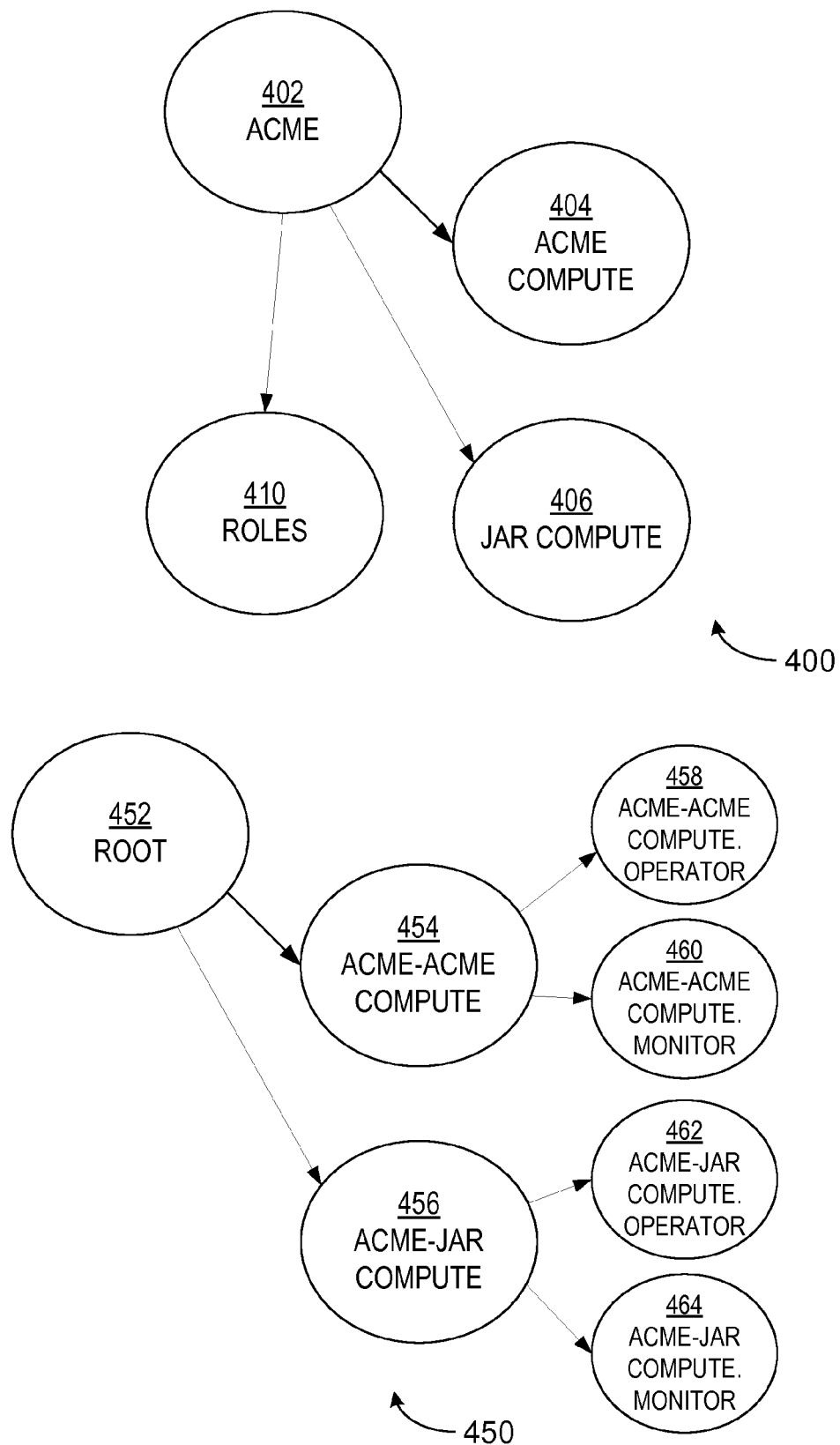
FIG. 4 is an example of a shared IDM system tenant and a corresponding Nimbula system tenant that is created automatically based on the shared IDM tenant, according to an embodiment of the invention.

FIG. 4 is an example of a shared IDM system tenant and a corresponding Nimbula system tenant that can be created automatically based on information about a tenant stored by a shared IDM system, according to an embodiment of the invention. By way of example, in the shared IDM system 400, there exists a node, tenant ACME 402. Tenant ACME 402 references a node ACME compute 404 for a subscription to a service, and a node service JAR compute 406 for a subscription to a JAR compute service. That is, tenant named ACME 402 has purchased a subscription to a compute service named ACME compute and also a subscription to a compute service named JAR compute.

As a result of performing techniques described herein, a new tenant may be created in a Nimbula system 450 based on the existence of a subscription to service ACME compute 404 by tenant ACME 402 in shared IDM system 400. The new tenant may be automatically provisioned for Nimbula system 450. The information about tenant ACME 402 may be translated from shared IDM system 400 to Nimbula system 450 by using information about tenant ACME 402 stored in shared IDM system 400. For example, the new tenant information for tenant ACME 402 may be created and stored in Nimbula system 450 using the names of both the corresponding tenant and the corresponding service of tenant ACME 402 in shared IDM system 400. As shown in the example of FIG. 4, new tenant information for tenant ACME 402 is created and stored in a node 454 (e.g., "service node") defined by on a combination of tenant name and service name, such as "tenant name.service name" (e.g., ACME-ACME compute 454). Tenant ACME-ACME compute 454 may be stored in Nimbula system 450 as a descendant node of root node 452 in Nimbula system 450. Root node 452 may store information referencing one or more descendant nodes stored by Nimbula system 450. Each descendant nodes of root node 452 may correspond to tenant information for a tenant that is permitted to access a service based on a subscription to that service indicated by shared IDM system 400.

Continuing from the example described above with reference to FIG. 4, a similar technique may be applied to translate to Nimbula system 450 the tenant information for the subscription to service JAR compute 406 by tenant ACME 402 stored in shared IDM system 400. The technique may include automatically provisioning, or creating another new tenant in Nimbula system 450 corresponding to tenant ACME 402 for subscription to service JAR computer 406. This other new tenant can be identified by the names of both the corresponding tenant (e.g., tenant ACME 402) and the corresponding service (e.g., JAR compute 406) in shared IDM system 400. This other new tenant is defined by node 456 for tenant ACME-JAR compute shown in FIG. 4. Tenant ACME-JAR compute 456 may be stored in Nimbula system 450 as a descendant of root node 452 in Nimbula system 450.

According to an embodiment of the invention, in addition to creating tenant information for a new tenant in Nimbula system 450 to map to the service subscriptions for that tenant in shared IDM system 400, techniques described herein also automatically create and associate role information for the newly created tenant. The role information for a new tenant in Nimbula system 450 may indicate one or more roles that are associated with a corresponding service subscriptions for the tenant in shared IDM system 400. For example, a node 458 (e.g., "role node") may be created for an operator role (e.g., ACME-ACME compute.operator 458) and a node may be created for a monitor role (e.g., ACME-ACME compute.monitor 460). Nodes 558, 460 may be automatically created as dependents of tenant ACME compute 454. Similarly, a node 462 may be created for an operator role (e.g., ACME-JAR compute.operator 462) and a node may be created for a monitor role (e.g., ACME-JAR compute.monitor 464) as dependents of tenant ACME-JAR compute 456. The role information for each of roles 458-464 may indicate permissions relative to the "service tenants" from which they depend. Users having these roles can be granted the corresponding permissions relative to the services that correspond to those tenants in Nimbula system 450.

According to an embodiment, Nimbula system 450, for each user, can extract the tenant name of the tenant to which that user belongs. The tenant name can be extracted from a descendant node referenced by root node 452. For example, if the tenant ("ACME") to which the user belongs is ACME-ACME compute 452, then the corresponding tenant name ACME is extracted from the name for ACME.ACME computer 454. The tenant name extracted from the node can be used by Nimbula system 450 to determine authentication for a user. As explained above, the tenant name stored by Nimbula system 450 may be based on the tenant information defined in shared IDM system 400. As such, shared IDM system 400 may be used to determine information about the use corresponding to the tenant name. For example, shared IDM system 400 may be requested to authenticate the user corresponding to the extracted tenant name. Nimbula system 450 can request shared IDM system to authenticate the tenant corresponding to the extracted tenant name, because in shared IDM system 400, the user belongs to tenant ACME 402.

Additionally, according to an embodiment, within Nimbula system 450, for a particular user authenticated using the process discussed above, the service name of the tenant to which that user belongs is extracted. For example, if the tenant to which the user belongs is ACME-ACME compute 452, then the corresponding extracted service name is ACME compute. Role information for roles stored within shared IDM system 400 are automatically searched to identify those roles possessed by the user that begin with the extracted service name—in this example, ACME compute. Within shared IDM system 400, roles 410 depend directly from tenant ACME 402. The roles pertaining to all of that tenant's subscriptions—to services 404 and 406—are stored within roles 410. A more detailed discussion of an example of the representation of roles and inheritance between those roles is presented further below in connection with FIG. 6.

Therefore, to determine whether a particular user from Nimbula system 450 has access to service ACME compute 404 in shared IDM system 400, Nimbula system, 450 can determine automatically whether a role starting with "ACME compute" is assigned to that user within roles 410. Roles 410 is selected rather than roles associated with some other tenant because the particular user was previously authenticated with tenant ACME 404 due to that being the particular user's extracted tenant name from Nimbula system 450.

In one embodiment, as a result of performing some of the actions discussed above, a user in a native Nimbula user model is automatically assigned specific group identifiers within the newly created tenant in Nimbula system 450. The group identifiers assigned to the user can be based on the roles that the corresponding user possesses for the corresponding service within roles 410 in shared IDM system 400. Prior to this assignment, a user may already exist as an entity within Nimbula system 450. The information used to generate the group identifier assignment can be pulled from an LDAP server in shared IDM system 400. Once group identifiers have been assigned to a user in Nimbula system 450, permissions associated with that group identifier in Nimbula system 450 can be checked to determine whether an operation that the user desires to perform is permitted or denied.

Figure 5:
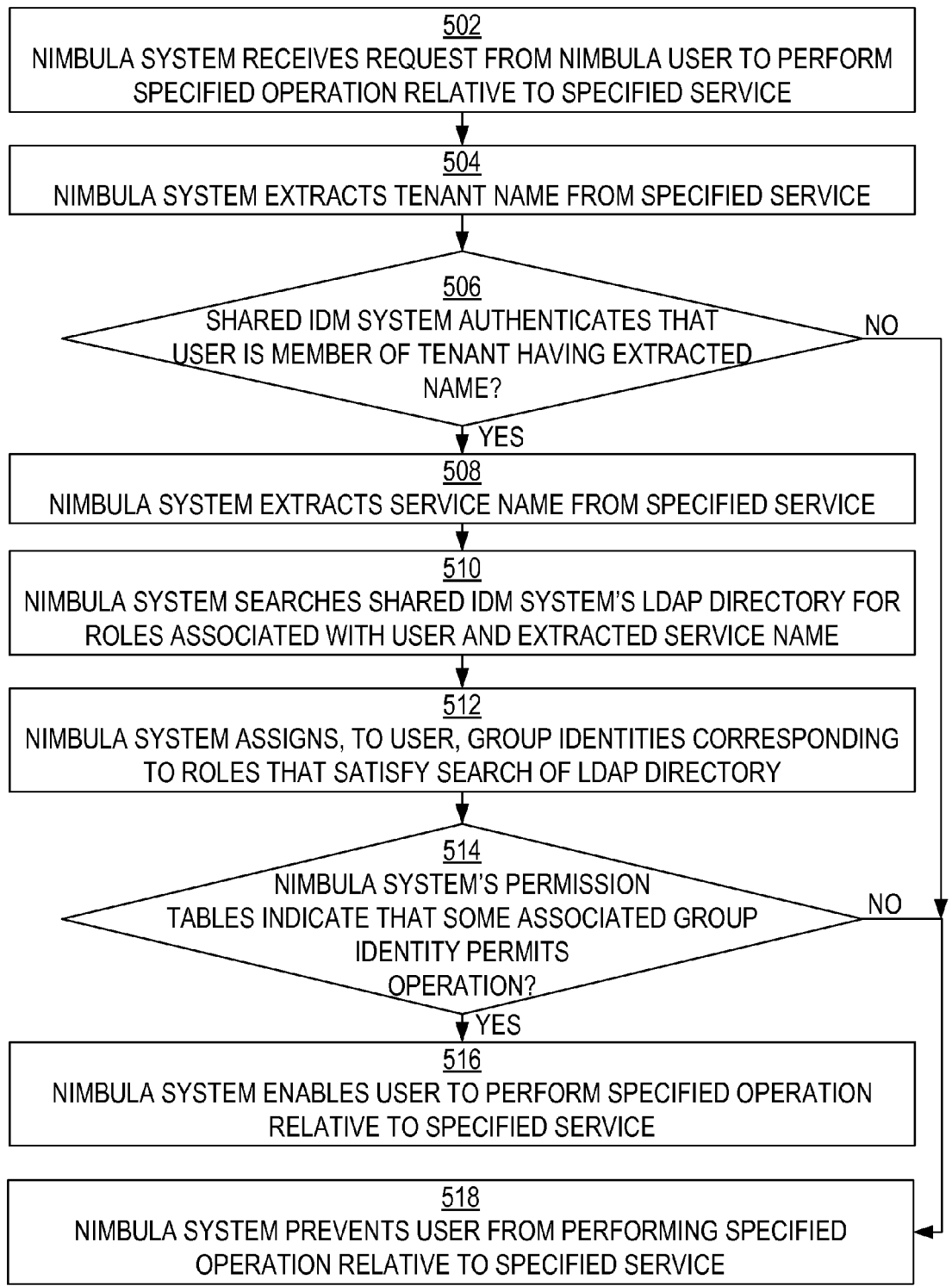
FIG. 5 is an example of a process for determining whether a user of a Nimbula system is allowed to perform specified operations relative to a specified service, according to an embodiment of the invention.

FIG. 5 is an example of a process 500 for determining whether a user of a Nimbula system is allowed to perform specified operations relative to a specified service, according to an embodiment of the invention. In some embodiments, process 500 may be implemented by one or more processing units of a computer system. The computer system may be included in a multi-tenant virtual system (e.g., a Nimbula system), such as any of the Nimbula systems described above.

The process depicted in FIG. 5 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 5 is not intended to be limiting. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Process 500 may begin at block 502, a Nimbula system receives a request from a user of the Nimbula system to perform a specified operation relative to a specified service. The service may be specified according to the syntax defined for the Nimbula system. The request may include a tenant name for which the user is associated. The tenant name may be included in the request as a prefix to the service name (e.g., ACME-ACME compute) of the specific service. Access to the requested service may be managed by a shared IDM system. As described below, the information in the request may be used to determine access to the service by the tenant.

At block 504, Nimbula system extracts information from the request. The information may include the tenant name (e.g., ACME) and the specified service. As explained above, the tenant name and the service name may be defined a single name (e.g., a combined name including the tenant name and the service name) according to the syntax of the Nimbula system. As such, the tenant name may be extracted from the request by processing the data in the request based on the syntax defined for the Nimbula system. In some embodiments, the service name may be extracted with the tenant name. However, in at least one embodiment, the service name may be extracted later upon determining that the user is authenticated based on the tenant name.

At block 506, the Nimbula system requests a shared IDM system to autheticate that the user of the request. The shared IDM system may be a system that manages access to services. The shared IDM system may be requested to authenticate the user based on the tenant name identified in the request. The shared IDM system may be requested to authenticate the user by determining whether the user is actually a member of the tenant identified by the extracted tenant name. The shared IDM system may determine that the user is successfully authenticated (e.g., member of the tenant based on accessing the node stored in a hierarchical data structure corresponding to the tenant name. Information about the tenant may be stored in a node for the tenant, if one exists. The user may be authenticated based on determining that the extracted tenant name matches the name of a tenant stored in a node. The user may not be successfully authenticated based on determining that the tenant name does not match the tenant name corresponding to any nodes storing tenant information.

In some embodiments, upon determining that the user that initiated the request is successfully authenticated by the shared IDM system, the shared IDM system may provide the Nimbula system with tenant information about the tenant stored by the shared IDM system. The Nimbula system may generate tenant information based on the tenant for which the user is a member. The tenant information may include the extracted tenant name. Generating the tenant information may include creating a node for storage by the Nimbula system. The node may be stored in association as a root node for a tenant described above.

Upon determining that the user that initiated the request is successfully authenticated by the shared IDM system, then process 500 may proceed to block 508. Upon determining that the user that initiated the request is not successfully authenticated by the shared IDM system, process 500 may process to block 518.

At block 508, the Nimbula system extracts the service name (e.g., ACME compute) from the specified service requested in block 502. Data in the request may be processed to extract the service name. The request may be processed using the syntax of the Nimbula system to identify the service name, if one was indicated in the request.

At block 510, the Nimbula system searches a directory (e.g., an LDAP directory) of the shared IDM system for role information that indicates the roles that are (a) associated with the user, qualified by the extracted tenant name and (b) associated with the extracted service name. When accessing the directory of the shared IDM system, the Nimbula system may receive role information that are identified in the directory. In some embodiments, the Nimbula system may access the directory of the shared IDM system to identify a set of roles.

The Nimbula system may verify whether the the user, qualified by the extracted tenant name has access to the service specified by the request. The services accessible to a tenant may be based on a subscription by the tenant as managed by the shared IDM system. Based on the subscription, the shared IDM system can determine the services accessible to the tenant and then the roles accessible to the tenant for each of those services. The Nimbula system may receive from the shared IDM system service information about the services accessible to the tenant. The service information may include the role information for accessing those services accessible to the tenant. The Nimbula system may determine the roles for a tenant by identifying those that associated with one or more services having a name that matches the extracted service name. The services may be those accessible to the user through the shared IDM system.

In some embodiments, the Nimbula system may generate service data for storage of the service information received from the shared IDM system. The Nimbula system may create a node for storage of service information. The node may be stored in association with the tenant information. The Nimbula system may generate role data for storage of the role information for accessing the services accessible to a tenant. The role data may indicate the operations permitted for a role. For example, the Nimbula system may create a node for each of the different roles indicated by the role information. The node for each role may be stored in association with the node for a service so that the roles accessible by a tenant for a service can be identified by the Nimbula system for subsequent requests for the service.

At block 512, for each such role identified by the role information obtained by the search performed at block 510, the Nimbula system assigns, to the requesting user, a group identity that corresponds to that role. In other words, the Nimbula system stores information, such as the group identity that maps the roles assigned to a tenant. The group may be designated based on the role. The group identity may be stored with the role data corresponding to the role.

At block 514, the Nimbula system determines, based on each of the group identities assigned to the role of the user and based on the permissions that are associated with those group identities within the Nimbula system's permission tables, whether the user is allowed to perform the specified operation relative to the specified service. The permission tables may be stored by the Nimbula system in the information for the node corresponding to each of the roles, or groups corresponding to those roles. The permission tables may indicate the operations that are permitted and/or not permitted for a service associated with the role or group. The Nimbula system can access the node corresponding to the specified service associated with a root node. The node for the specified service may indicate one or more nodes, each node corresponding to a role for accessing the service. The role information may be stored in a node corresponding to the role of the user. The role information may indicate the operations that can be performed for the role.

The user may be permitted to perform the specified operation based on determining that the operation is identified as a permitted operation in the role information for the role of the user. Upon determining that the user is permitted to perform the operation, process 500 may proceed to block 516. Upon determining that the user is not permitted to perform the operation, process 500 may process to block 518.

At block 516, the Nimbula system enables the user to access the specified service to perform the specified operation relative to the specified service within the Nimbula system. Enabling the user to access the specified service to perform the operation may include sending a message to a client system indicating that access is permitted. The Nimbula system may store information indicating that the specified operation is permitted to be accessed for the service. The information may be stored with tenant information. Process 500 then concludes.

Alternatively, at block 518, the Nimbula system prevents the user from accessing the specified service to perform the specified operation relative to the specified service within the Nimbula system. While some operations may not be permitted for a service, other operations may be permitted based on the role of the user. Preventing the user from accessing the operation may include sending a message to a client system indicating that access to the service is denied for the operation. The Nimbula system may store information indicating that the specified operation is denied for the service. As such, the user may be prevented by not processing the request and thereby, not enabling the operation to be performed. Process 500 then concludes.

Figure 6:
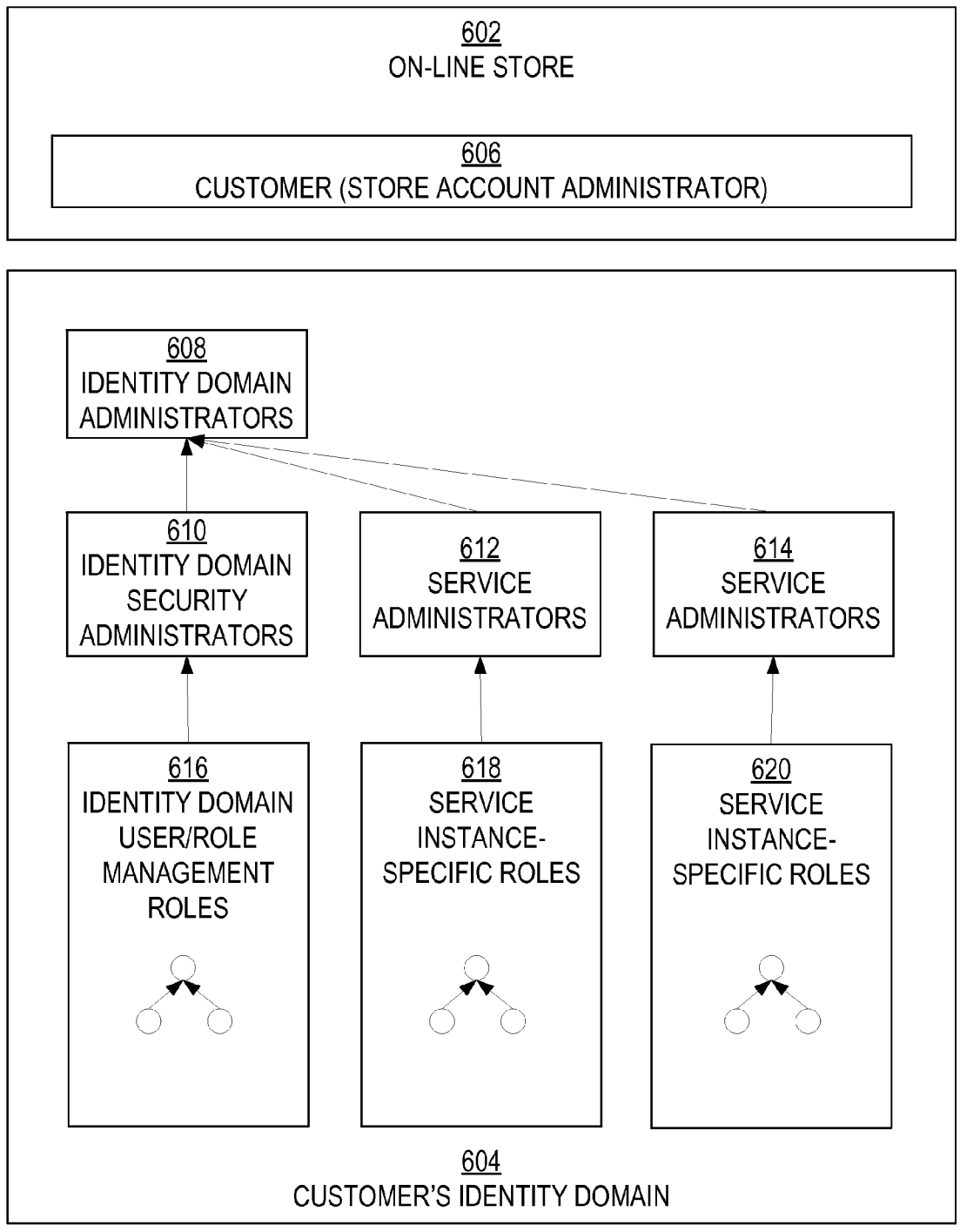
FIG. 6 is a block diagram that illustrates permission inheritance in a multi-tenant IDM system.

FIG. 6 is a block diagram that further illustrates permission inheritance in a multi-tenant IDM system 600 according to an embodiment of the invention, and as discussed above. System 600 can include a data store 602 ("an on-line store") and a data store 604 ("a customer's identity domain"). A customer 606 (e.g., a store account administrator) can have an account defined within on-line store 602. In an embodiment, customer 606 may not inherit any permissions because customer 606 is not associated with an identity within identity domain 604. Within identity domain 604, identity domain security administrators 610 can inherit permissions from identity domain user/role management roles 616. Service administrators 612 for one service instance can inherit permissions from service instance-specific roles 618 for that same service instance. Service administrators 614 for another service instance can inherit permissions from service instance-specific roles 620 for that other service instance. In turn, identity domain administrators 608 can inherit permissions from each of identity domain security administrators 610, and service administrators 612 and 614. Thus, in an embodiment, identity domain administrators 608 can inherit permissions to administer all service instances in identity domain 604.

Figure 7:
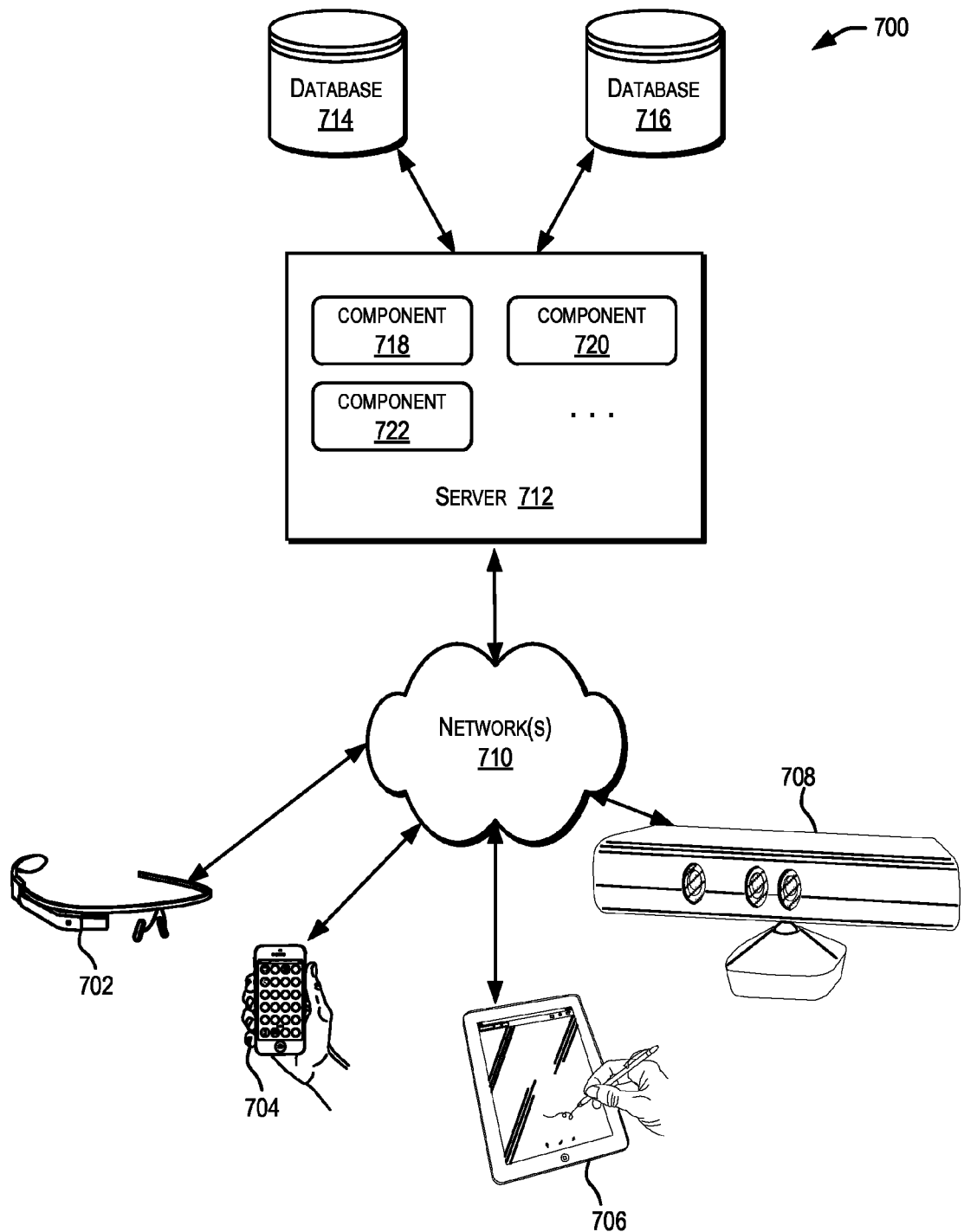
FIG. 7 depicts a simplified diagram of a distributed system for implementing an embodiment of the invention.

FIG. 7 depicts a simplified diagram of a distributed system 700 for implementing an embodiment. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications. In certain embodiments, server 712 may also provide other services or software applications can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

Client computing devices 702, 704, 706, and/or 708 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 710.

Although distributed system 700 in FIG. 7 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network (s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. These databases may provide a mechanism for storing information such as user interactions information, usage patterns information, adaptation rules information, and other information used by embodiments of the present invention. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle that are adapted to store, update, and retrieve data in response to SQL-formatted commands.

Figure 8:
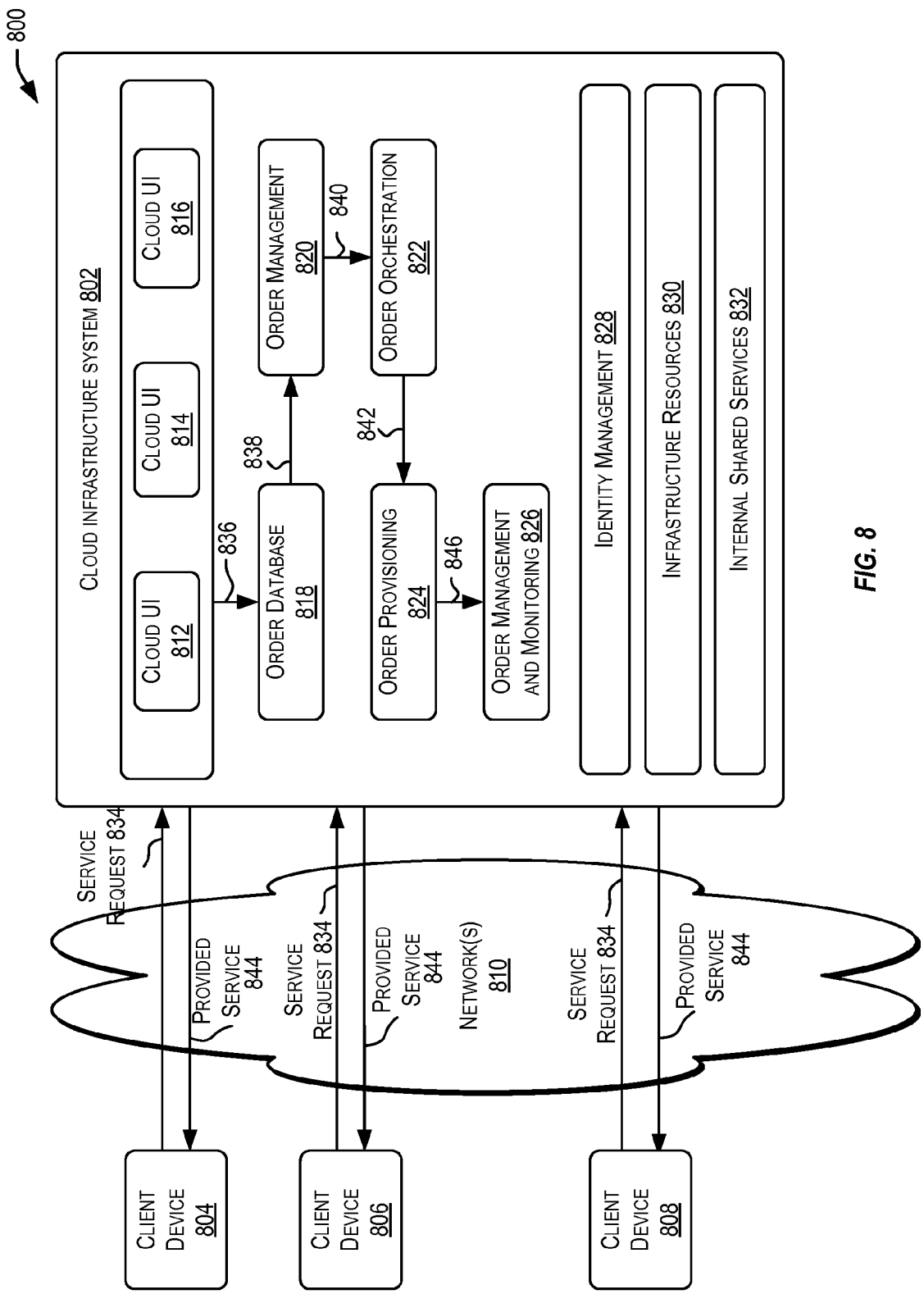
FIG. 8 illustrates a simplified block diagram of one or more components of a system environment in which services may be offered as cloud services, in accordance with an embodiment of the present disclosure.

In some embodiments, a cloud environment may provide one or more services. FIG. 8 is a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for client computing devices 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at step 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At step 836, the order information received from the customer may be stored in an order database 818. If this is a new order, a new record may be created for the order. In one embodiment, order database 818 can be one of several databases operated by cloud infrastructure system 818 and operated in conjunction with other system elements.

At step 838, the order information may be forwarded to an order management module 820 that may be configured to perform billing and accounting functions related to the order, such as verifying the order, and upon verification, booking the order.

At step 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at step 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At step 844, once the services and resources are provisioned, a notification may be sent to the subscribing customers indicating that the requested service is now ready for use. In some instance, information (e.g. a link) may be sent to the customer that enables the customer to start using the requested services.

At step 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
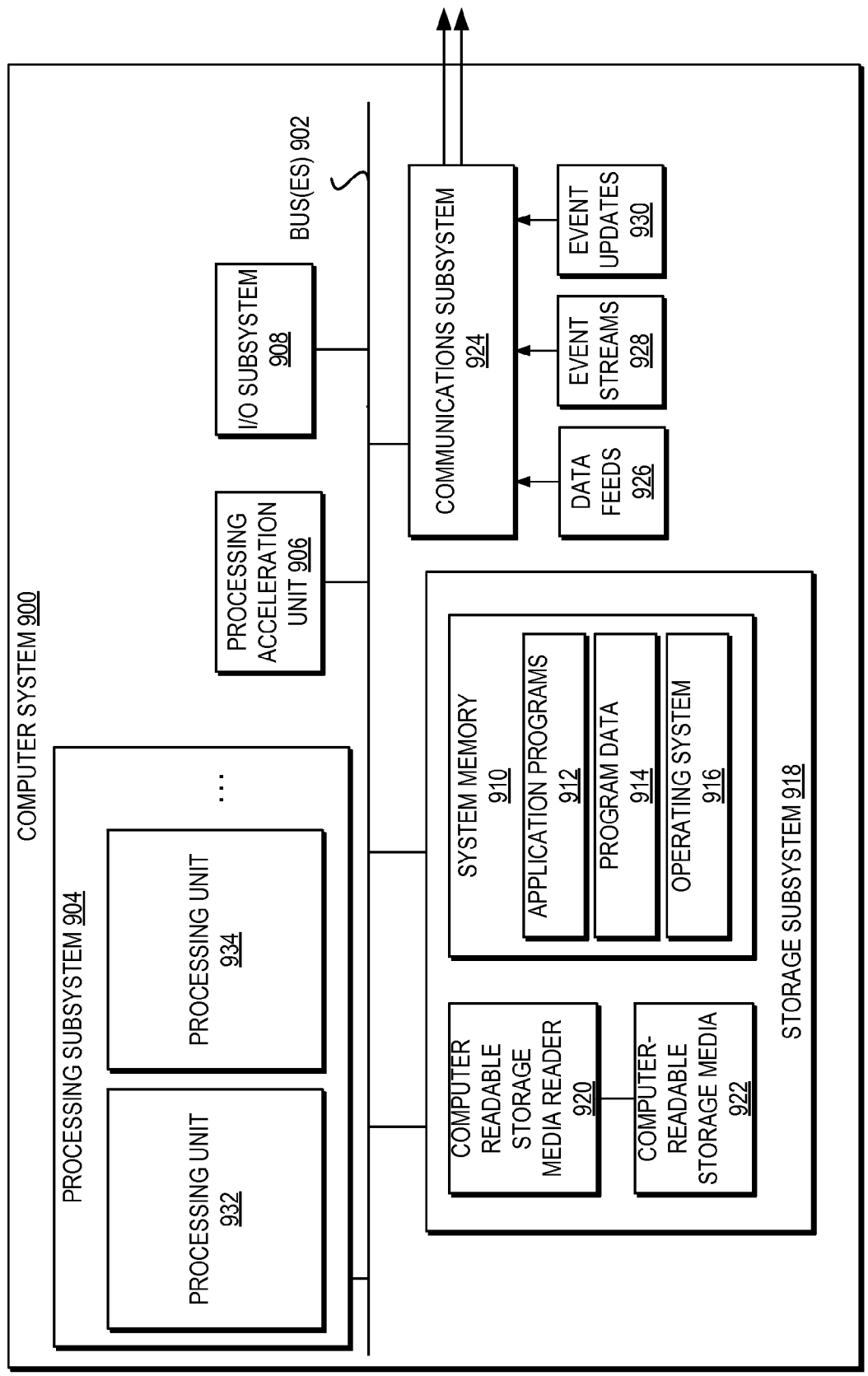
FIG. 9 illustrates an exemplary computer system that may be used to implement an embodiment of the present invention.

FIG. 9 illustrates an exemplary computer system 900 that may be used to implement an embodiment of the present invention. In some embodiments, computer system 900 may be used to implement any of the various servers and computer systems described above. As shown in FIG. 9, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described herein.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client computing devices via the Internet for receiving and sending information from and to the client computing devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
receiving, at a first computing system of a computing infrastructure system that provides access to a plurality of services, a request by a user to access a service of the plurality of services, wherein the computing infrastructure system restricts each tenant of the computing infrastructure system to one of the plurality of services;
extracting, by the first computing system, a tenant name and a service name of the service from a combined name included in the request;
authenticating, by the first computing system, the user by requesting a second computing system to determine whether the user is a member of a tenant having the tenant name in the second computing system, wherein the second computing system is different from the first computing system;
upon successfully authenticating that the user is the member of the tenant, accessing a directory of the second computing system to identify a set of roles that is both associated with the user and with a first service having the service name in the second computing system, wherein the first service is included in the plurality of services;
based on the set of roles, determining whether the user is permitted to perform an operation specified in the request relative to the service specified in the request; and
enabling the user to access the first service to perform the operation upon determining that a role in the set of roles is permitted to perform the operation specified in the request.

2. The method of claim 1, further comprising:
preventing the user from accessing the first service to perform the operation upon determining that no role in the set of roles is permitted to perform the operation specified in the request.

3. The method of claim 1, wherein the second computing system is included in an identity management system.

4. The method of claim 3, wherein the second computing system provides the user with access to the first service based on a subscription by the tenant to the first service managed by the identity management system, and wherein the identity management system stores role information about each of the set of roles for accessing the first service.

5. The method of claim 4, wherein the role information indicates one or more operations that are permitted by the tenant for the subscription to the first service, and wherein determining whether the user is permitted to perform an operation specified in the request includes determining whether the operation is included in the one or more operations that are permitted by the tenant for the subscription to the first service.

6. The method of claim 4, wherein accessing the directory of the second computing system to identify the set of roles includes receiving the role information about each of the set of roles that is both associated with the user and with the first service having the service name.

7. The method of claim 1, further comprising:
generating, by the first computing system, tenant information based on the tenant for which the user is the member of the tenant, wherein the tenant information includes the tenant name; and
storing, at the first computing system, service data about the first service having the service name in association with the tenant information, wherein the service data indicates role information about the set of roles for accessing the first service.

8. A system comprising:
one or more processors; and
a memory coupled with and readable by the one or more processors, the memory configured to store a set of instructions that, when executed by the one or more processors, causes the one or more processors to:
receive, at a first computing system of a computing infrastructure system that provides access to a plurality of services, a request by a user to access a service of the plurality of services, wherein the computing infrastructure system restricts each tenant of the computing infrastructure system to one of the plurality of services;
extract, by the first computing system, a tenant name and a service name of the service from a combined name included in the request;
authenticate, by the first computing system, the user by requesting a second computing system to determine whether the user is a member of a tenant having the tenant name in the second computing system, wherein the second computing system is different from the first computing system;
upon successfully authenticating that the user is the member of the tenant, access a directory of the second computing system to identify a set of roles that is both associated with the user and with a first service having the service name in the second computing system, wherein the first service is included in the plurality of services;
based on the set of roles, determine whether the user is permitted to perform an operation specified in the request relative to the service specified in the request; and
enable the user to access the first service to perform the operation upon determining that a role in the set of roles is permitted to perform the operation specified in the request.

9. The system of claim 8, wherein the set of instructions, when executed by the one or more processors, further causes the one or more processors to:
request the second computing system to provide subscription information for one or more services to which the tenant is subscribed, wherein the first service is included in the one or more services;

generate, by the first computing system, a service node structure including tenant information for the tenant permitted to access the first service, wherein the tenant information is based on a combination of the tenant name and the service name;

store the service node structure in association with a root node structure, the root node structure storing information identifying a plurality of service node structures;

generate a role node structure including service data about the first service having the service name in association with the tenant information, wherein the service data indicates role information about the set of roles for accessing the first service;

store the service node structure in association with the role node structure; and prevent the user from accessing the first service to perform the operation upon determining that no role in the set of roles is permitted to perform the operation specified in the request;

wherein the second computing system is included in an identity management system, wherein the directory of the second computing system is a Lightweight Directory Access Protocol (LDAP) directory that includes a node structure for each of a plurality of identity domains, the node structure for each of the plurality of identity domains identifying one or more roles defined within the identity domain, and wherein the identity management system stores role information about each of the set of roles for accessing the first service;

wherein authenticating the user includes: sending a request to the second computing system to determine whether the user is the member of the tenant having the tenant name, and receiving, from the second computing system, an authentication response indicating that the user is the member of the tenant having the tenant name;

wherein the second computing system provides the user with access to the first service based on a subscription by the tenant to the first service of the one or more services; and wherein accessing the directory of the second computing system to identify the set of roles includes receiving the role information about each of the set of roles that is both associated with the user and with the first service having the service name.

10. The system of claim 8, wherein the set of instructions, when executed by the one or more processors, further causes the one or more processors to:

prevent the user from accessing the first service to perform the operation upon determining that no role in the set of roles is permitted to perform the operation specified in the request.

11. The system of claim 8, wherein the second computing system is included in an identity management system.

12. The system of claim 11, wherein the second computing system provides the user with access to the first service based on a subscription by the tenant to the first service managed by the identity management system, wherein the identity management system stores role information about each of the set of roles for accessing the first service, wherein the role information indicates one or more operations that are permitted by the tenant for the subscription to the first service, and wherein determining whether the user is permitted to perform an operation specified in the request includes determining whether the operation is included in the one or more operations that are permitted by the tenant for the subscription to the first service.

13. The system of claim 12, wherein accessing the directory of the second computing system to identify the set of roles includes receiving the role information about each of the set of roles that is both associated with the user and with the first service having the service name.

14. The system of claim 8, wherein the set of instructions, when executed by the one or more processors, further causes the one or more processors to:

generate, by the first computing system, tenant information based on the tenant for which the user is the member of the tenant, wherein the tenant information includes the tenant name; and store, at the first computing system, service data about the first service having the service name in association with the tenant information, wherein the service data indicates role information about the set of roles for accessing the first service.

15. A non-transitory computer-readable storage memory storing a plurality of instructions executable by one or more processors to cause the one or more processors to:

receive, at a first computing system of a computing infrastructure system that provides access to a plurality of services, a request by a user to access a service of the plurality of services, wherein the computing infrastructure system restricts each tenant of the computing infrastructure system to one of the plurality of services;

extract, by the first computing system, a tenant name and a service name of the service from a combined name included in the request;

authenticate, by the first computing system, the user by requesting a second computing system to determine whether the user is a member of a tenant having the tenant name in the second computing system, wherein the second computing system is different from the first computing system;

upon successfully authenticating that the user is the member of the tenant, access a directory of the second computing system to identify a set of roles that is both associated with the user and with a first service having the service name in the second computing system, wherein the first service is included in the plurality of services;

based on the set of roles, determine whether the user is permitted to perform an operation specified in the request relative to the service specified in the request; and enable the user to access the first service to perform the operation upon determining that a role in the set of roles is permitted to perform the operation specified in the request.

16. The non-transitory computer-readable storage memory of claim 15, wherein the plurality of instructions further cause the one or more processors to:

prevent the user from accessing the first service to perform the operation upon determining that no role in the set of roles is permitted to perform the operation specified in the request.

17. The non-transitory computer-readable storage memory of claim 15, wherein the second computing system is included in an identity management system, and wherein authenticating the user includes sending a request to the second computing system to determine whether the user is the member of the tenant.

18. The non-transitory computer-readable storage memory of claim 17, wherein the second computing system provides the user with access to the first service based on a subscription by the tenant to the first service managed by the identity management system, and wherein the identity management system stores role information about each of the set of roles for accessing the first service.

19. The non-transitory computer-readable storage memory of claim 18, wherein accessing the directory of the second computing system to identify the set of roles includes receiving the role information about each of the set of roles that is both associated with the user and with the first service having the service name.

20. The non-transitory computer-readable storage memory of claim 15, wherein the plurality of instructions further cause the one or more processors to:
  generate, by the first computing system, tenant information based on the tenant for which the user is the member of the tenant, wherein the tenant information includes the tenant name; and
  store, at the first computing system, service data about the first service having the service name in association with the tenant information, wherein the service data indicates role information about the set of roles for accessing the first service.

* * * * *

UNITED STATES PATENT AND TRADEMARK OFFICE
CERTIFICATE OF CORRECTION

PATENT NO. : 9,721,117 B2
APPLICATION NO. : 14/853747
DATED : August 1, 2017
INVENTOR(S) : Pleau et al.

Page 1 of 1

It is certified that error appears in the above-identified patent and that said Letters Patent is hereby corrected as shown below:

In the Specification

In Column 1, Line 45, delete "as service (SaaS)" and insert -- as a service (SaaS) --, therefor.

In Column 5, Line 59, delete "infrastrasture" and insert -- infrastructure --, therefor.

In Column 7, Line 20, delete "infrastrasture" and insert -- infrastructure --, therefor.

In Column 7, Line 40, delete "(Saas)" and insert -- (SaaS) --, therefor.

In Column 15, Line 5, delete "autheticate" and insert -- authenticate --, therefor.

In Column 15, Line 56, delete "the the" and insert -- the --, therefor.

Signed and Sealed this
Thirty-first Day of July, 2018

Andrei Iancu
*Director of the United States Patent and Trademark Office*